US007844538B2

(12) United States Patent
Wallman (10) Patent No.: US 7,844,538 B2
(45) Date of Patent: Nov. 30, 2010

(54) METHOD AND APPARATUS FOR TRADING SECURITIES OR OTHER INSTRUMENTS

(75) Inventor: Steven M. H. Wallman, Great Falls, VA (US)

(73) Assignee: Folio, Inc., Vienna, VA (US)

( * ) Notice: Subject to any disclaimer, the term of this patent is extended or adjusted under 35 U.S.C. 154(b) by 0 days.

(21) Appl. No.: 11/898,150

(22) Filed: Sep. 10, 2007

(65) Prior Publication Data
US 2008/0005013 A1    Jan. 3, 2008

Related U.S. Application Data

(63) Continuation of application No. 11/109,777, filed on Apr. 20, 2005, now abandoned, which is a continuation of application No. 09/516,787, filed on Mar. 1, 2000, now abandoned, which is a continuation-in-part of application No. 09/139,020, filed on Aug. 24, 1998, now Pat. No. 6,601,044, which is a continuation-in-part of application No. 09/038,158, filed on Mar. 11, 1998, now Pat. No. 6,996,539.

(51) Int. Cl.
 *G06Q 40/00* (2006.01)
(52) U.S. Cl. ................................................. 705/37
(58) Field of Classification Search .............. 705/35–37
 See application file for complete search history.

(56) References Cited

U.S. PATENT DOCUMENTS 4,346,442 A    8/1982 Musmanno ............... 364/408
4,376,978 A    3/1983 Musmanno ............... 364/408
4,566,066 A    1/1986 Towers .................... 364/408
4,597,046 A    6/1986 Musmanno et al. ....... 364/408
4,642,768 A    2/1987 Roberts ................... 364/408
4,648,038 A    3/1987 Roberts et al. ........... 364/408

(Continued)

FOREIGN PATENT DOCUMENTS

JP        6-295300        3/2000

(Continued)

OTHER PUBLICATIONS

95th Congress, 1st Session Committee Print, Report on Banks Securities Activities of the Securities and Exchange Commission Pursuant to Section 11A(e) of the Securities and Exchange Act of 1934 (public Law 94-29), Aug. 1977, pp. 3-101, US Government Printing Office, Washington, D.C.

(Continued)

*Primary Examiner*—Hani Kazimi
(74) *Attorney, Agent, or Firm*—Kenyon & Kenyon LLP (57) ABSTRACT

A method and apparatus for trading securities trades on behalf of customers expressing orders in both share and dollar amounts. Where a brokerage receives orders from customers in both dollar and share amounts, the brokerage can combine the orders, e.g., by aggregating and netting, and executing the outstanding orders through a market maker. The number of shares to order through the market maker depends on the price at which the market maker can execute. By capturing the spread, the spread can be equitably distributed among buyers and sellers without regard for whether the order was received as a value-based order or a share-based order.

7 Claims, 3 Drawing Sheets

U.S. PATENT DOCUMENTS

| | | | | |
|---|---|---|---|---|
| 4,674,044 A | 6/1987 | Kalmus et al. | | 364/408 |
| 4,750,121 A | 6/1988 | Halley et al. | | 364/408 |
| 4,751,640 A | 6/1988 | Lucas et al. | | 364/408 |
| 4,774,663 A | 9/1988 | Musmanno et al. | | 364/408 |
| 4,910,676 A | 3/1990 | Alldredge | | 364/408 |
| 4,933,842 A | 6/1990 | Durbin et al. | | 364/408 |
| 4,953,085 A | 8/1990 | Atkins | | 364/408 |
| 4,980,826 A | 12/1990 | Wagner | | 364/408 |
| 4,989,141 A | 1/1991 | Lyons et al. | | 364/408 |
| 4,994,964 A | 2/1991 | Wolfberg et al. | | 364/408 |
| 5,038,284 A | 8/1991 | Kramer | | 364/408 |
| 5,101,353 A | 3/1992 | Lupien et al. | | 364/408 |
| 5,126,936 A | 6/1992 | Champion et al. | | |
| 5,132,899 A | 7/1992 | Fox | | 364/408 |
| 5,148,365 A | 9/1992 | Dembo | | 364/402 |
| 5,155,847 A | 10/1992 | Kirouac et al. | | |
| 5,193,056 A | 3/1993 | Boes | | 364/408 |
| 5,202,827 A | 4/1993 | Sober | | 364/408 |
| 5,210,687 A | 5/1993 | Wolfberg et al. | | 364/408 |
| 5,214,579 A | 5/1993 | Wolfberg et al. | | 364/408 |
| 5,220,500 A | 6/1993 | Baird et al. | | 364/408 |
| 5,227,967 A | 7/1993 | Bailey | | 364/408 |
| 5,262,942 A | 11/1993 | Earle | | 364/408 |
| 5,270,922 A | 12/1993 | Higgins | | 364/408 |
| 5,297,032 A | 3/1994 | Trojan et al. | | 364/408 |
| 5,375,055 A | 12/1994 | Togher et al. | | 364/408 |
| 5,497,317 A | 3/1996 | Hawkins et al. | | 364/408 |
| 5,517,406 A | 5/1996 | Harris et al. | | 364/408 |
| 5,649,116 A | 7/1997 | McCoy et al. | | 395/238 |
| 5,664,115 A | 9/1997 | Fraser | | 705/37 |
| 5,671,363 A | 9/1997 | Cristofich et al. | | 395/237 |
| 5,689,650 A | 11/1997 | McClelland et al. | | 395/236 |
| 5,689,652 A | 11/1997 | Lupien et al. | | |
| 5,704,045 A | 12/1997 | King et al. | | 395/235 |
| 5,710,889 A | 1/1998 | Clark et al. | | 395/244 |
| 5,724,524 A | 3/1998 | Hunt et al. | | 395/237 |
| 5,729,700 A | 3/1998 | Melnikoff | | 395/236 |
| 5,745,706 A | 4/1998 | Wolfberg et al. | | 395/235 |
| 5,749,077 A | 5/1998 | Campbell | | 705/36 |
| 5,758,097 A | 5/1998 | Debe et al. | | 395/235 |
| 5,761,441 A | 6/1998 | Bennett | | 395/235 |
| 5,761,442 A | 6/1998 | Barr et al. | | 395/236 |
| 5,765,141 A | 6/1998 | Spector | | 705/14 |
| 5,774,881 A | 6/1998 | Friend et al. | | 705/36 |
| 5,784,696 A | 7/1998 | Meinikoff | | 705/36 |
| 5,794,219 A | 8/1998 | Brown | | 705/37 |
| 5,799,287 A | 8/1998 | Dembo | | 705/36 |
| 5,806,047 A | 9/1998 | Hackel et al. | | 705/36 |
| 5,806,049 A | 9/1998 | Petruzzi | | 705/36 |
| 5,812,987 A | 9/1998 | Luskin et al. | | 705/36 |
| 5,819,237 A | 10/1998 | Garman | | |
| 5,845,266 A | 12/1998 | Lupien et al. | | |
| 5,873,071 A | 2/1999 | Ferstenberg et al. | | |
| 5,918,217 A | 6/1999 | Maggioncalda et al. | | |
| 5,918,218 A | 6/1999 | Harris et al. | | 705/37 |
| 5,924,082 A | 7/1999 | Silverman et al. | | |
| 5,930,762 A | 7/1999 | Masch | | |
| 5,930,774 A | 7/1999 | Chennault | | 705/36 |
| 5,946,666 A | 8/1999 | Nevo et al. | | 705/36 |
| 5,960,411 A | 9/1999 | Hartman et al. | | |
| 5,978,778 A | 11/1999 | O'Shaughnessy | | 705/36 |
| 5,999,918 A | 12/1999 | Williams et al. | | |
| 6,018,722 A | 1/2000 | Ray et al. | | |
| 6,021,397 A | 2/2000 | Jones et al. | | |
| 6,035,287 A | 3/2000 | Stallaert et al. | | |
| 6,044,352 A | 3/2000 | Deavers | | |
| 6,098,051 A * | 8/2000 | Lupien et al. | | 705/36 R |
| 6,098,052 A | 8/2000 | Kosiba | | |
| 6,393,409 B2 | 5/2002 | Young | | |
| 6,601,044 B1 | 7/2003 | Wallman | | |
| 6,615,188 B1 * | 9/2003 | Breen et al. | | 705/37 |
| 6,721,715 B2 * | 4/2004 | Nemzow | | 705/26 |
| 6,996,539 B1 | 2/2006 | Wallman | | |
| 7,110,971 B2 | 9/2006 | Wallman | | |
| 7,117,176 B2 | 10/2006 | Wallman | | |

FOREIGN PATENT DOCUMENTS

| | | |
|---|---|---|
| WO | WO 98/44443 | 10/1998 |
| WO | WO 98/44444 | 10/1998 |
| WO | WO 99/28845 | 6/1999 |

OTHER PUBLICATIONS

Colby, Robert L. D., Response to Mar. 14, 1988 letter regarding "Exchange Act" from Spirer, Kenneth S., Apr. 14, 1988, pp. 1-12, Securities and Exchange Commission, Office of Chief Counsel, Division of Market Regulation, Washington, D.C.

Engel, Louis, et al., How to Buy Stocks, Eighth Edition, Little, Brown and Company, 1994, pp. 123-127, Canada.

Elgin, Peggie R., SPDR web ensnares both active, passive fund managers. (Standard & Poor's 500 Depository Receipts) (Investments & Benefits), Corporate Cashflow Magazine, Dec. 1, 1993.

Merrill Lynch, Pierce, Fenner & Smith Inc., Merrill Lynch announces a break for the small investor, 1974.

Perham, John C., Stock Exchange Explains Its Pay-As-You-Go Plan, Barron's National Business and Financial Weekly (1942-Current file), Aug. 24, 1953, 33,34 p. 6.

Rosenblat Alan, Response to Oct. 19, 1971 letter regarding the "Plan" from Reavis McGrath, Apr. 19, 1972, pp. 1-5, Securities and Exchange Commission, Office of Chief Counsel, Division of Corporate Regulation, Washington, D.C.

Rosenblat, Alan, Response to Dec. 5, 1974 Letter to SEC from Baron, Neil D., Nov. 23, 1975, pp. 1-8, Securities and Exchange Commission, Office of Chief Counsel, Division of Investment Management Regulation, Washington, D.C., 1975 Westlaw 11120.

Rosenblat, Alan, Response to Dec. 5, 1974 Request for No-Action letter from Baron, Neil D., Nov. 23, 1975, pp. 1-14, Securities and Exchange Commission, Office of Chief Counsel, Division of Investment Management Regulation, Washington, D.C.

Rosenblat, Alan, Response to letters of May 7, 1973 and May 13, 1973 regarding Investment Data Corporation and SEC No-Action Letter from Dudley, John A., Jun. 15, 1973, pp. 1-7, Securities and Exchange Commission, Office of Chief Counsel, Division of Investment Management Regulation, Washington, D.C., 1973 Westlaw 6859.

Rosenblat, Alan, Response to Oct. 19, 1971 Letter to SEC from Reavis & McGrath, May 21, 1972, pp. 1-3, Securities and Exchange Commission, Office of Chief Counsel, Division of Investment Management Regulation, Washington, D.C., 1972 Westlaw 12253.

Sharpe, William F., The Sharpe Ratio, The Journal of Portfolio Management, Fall 1994, New York, N.Y.

Robert Barker, A Capital-Gains Miracle Worker, Business Week, Jan. 31, 2000, p. 130.

Anne Tergesen, Here Come the E-Funds, Business Week, Jan. 31, 2000, p. 125.

1998 ADP Investor Communications Services, ProxyEdge™ 2000.

John C. Perham, Stock Exchange Explains Its Pay-As-You-Go Plan, Barron's National Business and Financial Weekly, Aug. 24, 1953.

Margaret Dibben, Just let your fingers do the dealing Cut-price services mean that calling your broker is no longer the preserve of the idle rich, The Guardian, Oct. 23, 1994.

Kathleen Pender, Stock Trading, San Francisco Chronicle, Jun. 23, 1986.

"Welcome to DRIP Central" at http://www.dripcentral.com (2 pages), printed Feb. 20, 2001.

www.itginc.com/products/posit/posit_more.htm, Jun. 2000.

J.Z. Money, Apr. 1997, vol. 26, Issue 4, p. 82, Apr. 1997.

Business Wire p0699, Feb. 29, 2000.

Anonymous; Yearbook Supplement, pp. 95-99; Global Investor; 1995; seven pages.

Anonymous; The 1996 guide to Switzerland Supplement, pp. 2-5; Euromoney; Mar. 1996; seven pages.

Web Pages for "One Share of Stock Inc"; Internet web archive; Dec. 1996; five pages.

John Downes (Editor); Dictionary of Finance and Investment Terms; 1998; Barron's Educational Series, Inc.; Fifth Edition; p. 455.

Business Editors; Alaska Air Group Inc. Announcement; Business Wire; Sep. 1987; one page.

"Self-Regulatory Organizations; Filing of Proposed Rule Change by New York Stock Exchange, Inc. Relating to Amendment to Rule 411(b) Regarding the Entry of Odd-Lot Orders", Federal Register, Mar. 17, 1992, p. 9299, vol. 57, Issue 52, Washington, DC, US.

Jon Newberry, "Bye bye broker", ABA Journal, Mar. 1998, p. 90, vol. 84, Chicago, US.

"Direct-Buy Stocks Cut Out Middle Man", Palm Beach Post, Mar. 9, 1998, p. 17, Palm Beach, US.

"Frankfurt to Launch Trading System", Wall Street Journal (Europe), Oct. 7, 1997, p. 14, Brussels, BE.

* cited by examiner

METHOD AND APPARATUS FOR TRADING SECURITIES OR OTHER INSTRUMENTS

This is a continuation of application Ser. No. 11/109,777 filed 20 Apr. 2005 now abandoned, which is a continuation of application Ser. No. 09/516,787 filed 1 Mar. 2000 now abandoned, which is a continuation-in-part of application Ser. No. 09/139,020 filed 24 Aug. 1998, U.S. Pat. No. 6,601,044, which is a continuation-in-part of application Ser. No. 09/038,158 filed 11 Mar. 1998 now U.S. Pat. No. 6,996,539, the contents of which are incorporated herein by reference in their entirety.

RELATED APPLICATIONS

This is a continuation of U.S. patent application Ser. No. 09/516,787, filed on Mar. 1, 2000, which is a continuation-in-part of U.S. patent application Ser. No. 09/139,020, filed on Aug. 24, 1998, issued as U.S. Pat. No. 6,601,044, which is a continuation-in-part of U.S. patent application Ser. No. 09/038,158, filed on Mar. 11, 1998. Both U.S. patent application Ser. Nos. 09/038,158 and 09/139,020 disclose a portfolio manager for creating and managing portfolios of securities, in which, among other things, trades are aggregated and netted prior to executing certain types of securities trades. The U.S. patent application Ser. Nos. 09/038,158 and 09/139,020 are hereby incorporated by reference, as if repeated herein in its entirety, including the drawings.

BACKGROUND OF THE INVENTION

The present invention relates generally to methods and apparatuses for trading securities or other instruments on behalf of investors, and more particularly to a method for trading securities on behalf of investors, in which trades are made as part of an investment portfolio.

Traditional full-service and online brokerages accept orders to purchase a particular number of shares of a security. The brokerages then execute those orders through a market maker in that security. These orders may take one of a variety of forms. The basic forms include: (a) market orders, in which the customer orders the brokerage to buy or sell a specified number of shares at the best price currently available in the market; and (b) limit orders, in which the customer orders the brokerage to buy or sell a specified number of shares at or better than a specified price. The orders are then relayed to market makers for execution in essentially the same form that they are presented to the brokerages by the customers. That is, the brokerages frequently do little more than pass the order on to the market maker for execution.

There are several limitations to this traditional method of executing orders to trade securities. First, they are relatively inefficient from a transaction cost perspective. There are economies of scale to be gained by combining the orders and presenting the market maker with one large order per stock, rather than hundreds or even thousands of small orders per stock.

Second, this method does not always secure the best execution for customers. For example, assume the bid-ask spread on a stock X is $1. If customer one, $C_1$, wants to buy that stock from a brokerage using the traditional method, $C_1$ will pay $P_a$ (the ask price). If the brokerage has another customer, $C_2$, who wants to sell the same stock at the same time, $C_2$ will pay $P_b$ (the bid price)=$P_a$−$1. If the brokerage were to combine the orders, however, it could execute the trade at a superior price from the perspective of both $C_1$ and $C_2$ by selling $C_2$'s stock to $C_1$ at the mid-point price, $P_m=(P_a+P_b)/2$. This yields the buying customer a lower price and the selling customer a higher price than either would get under the traditional method.

Third, the traditional method requires investors to trade in share amounts, rather than dollar amounts. Normally, an investor places a market order by specifying a number of shares that the investor wishes to buy or sell and entrusting the brokerage to obtain the best execution within a short timeframe. The investor using a market order can approximate the dollar amount involved in the transaction only by multiplying the number of shares specified by the price at which the investor believes the trade will be executed. Typically, however, the investor has only a rough idea of what the execution price will be. The investor has a somewhat better idea of what the maximum or minimum dollar amount of a purchase or sale will be if the investor places a limit order. Even under a limit order, however, the investor will not know the dollar amount of the trade until the trade is executed. The investor also risks not having the order executed at once or at all, if the conditions of the limit order are not satisfied either at once or within the period in which the order is effective.

Many mutual funds permit investors to express orders in dollar amounts or in share amounts. This practice, however, also suffers from several limitations. First, mutual funds do not combine the orders for execution on an open market. Rather, mutual funds combine orders to determine net cash flow into or out of the fund. Mutual funds then either invest the cash inflow or sell assets to raise money to cover the cash outflow. Second, mutual funds are generally priced at the end of the day and offer the same price per share to sellers and buyers (although the mutual fund may adjust the price to either to reflect either a back-end or front-end load). Hence, mutual funds do not have a method for equitably allocating a spread between a bid price and an ask price of a security among customers.

Accordingly, there is a need in the art for removing inefficiencies in the trading of securities or other tradable instruments representing underlying assets and liabilities, while adding more certainty to the trader as to the amount of the transaction prior to execution or even submission to the brokerage.

SUMMARY OF THE INVENTION

Embodiments of the present invention allow investors to place orders specified by their value, rather than only by share amounts. Embodiments of the present invention also provide a method for processing trading orders in at least one instrument, in which orders may be received as either value-based or share-based orders. The method can include combining a value-based trading order for at least one instrument with a share-based trading order for the at least one instrument to create a final trading order for the at least one instrument.

DETAILED DESCRIPTION

Although the embodiments of the present invention are described herein in terms of orders to buy shares of stock, the present invention can be equally applicable to orders to buy any instrument representing an underlying tradable asset or liability, including, but not limited to government bonds, Treasury-bills, shares in mutual funds, shares in investment trusts, derivatives, investment contracts, bearer bonds, mutual funds, bank notes, insurance contracts, letters of credit, etc. Furthermore, although the embodiments of the present invention are described in terms of dollars, the present invention can be equally applicable to transactions in any currency or denomination or other variable that is deterministically convertible to a number of shares. In fact, one aspect of the present invention provides certain advantages for processing of orders received in multiple currencies.

Overview

Figure 1:
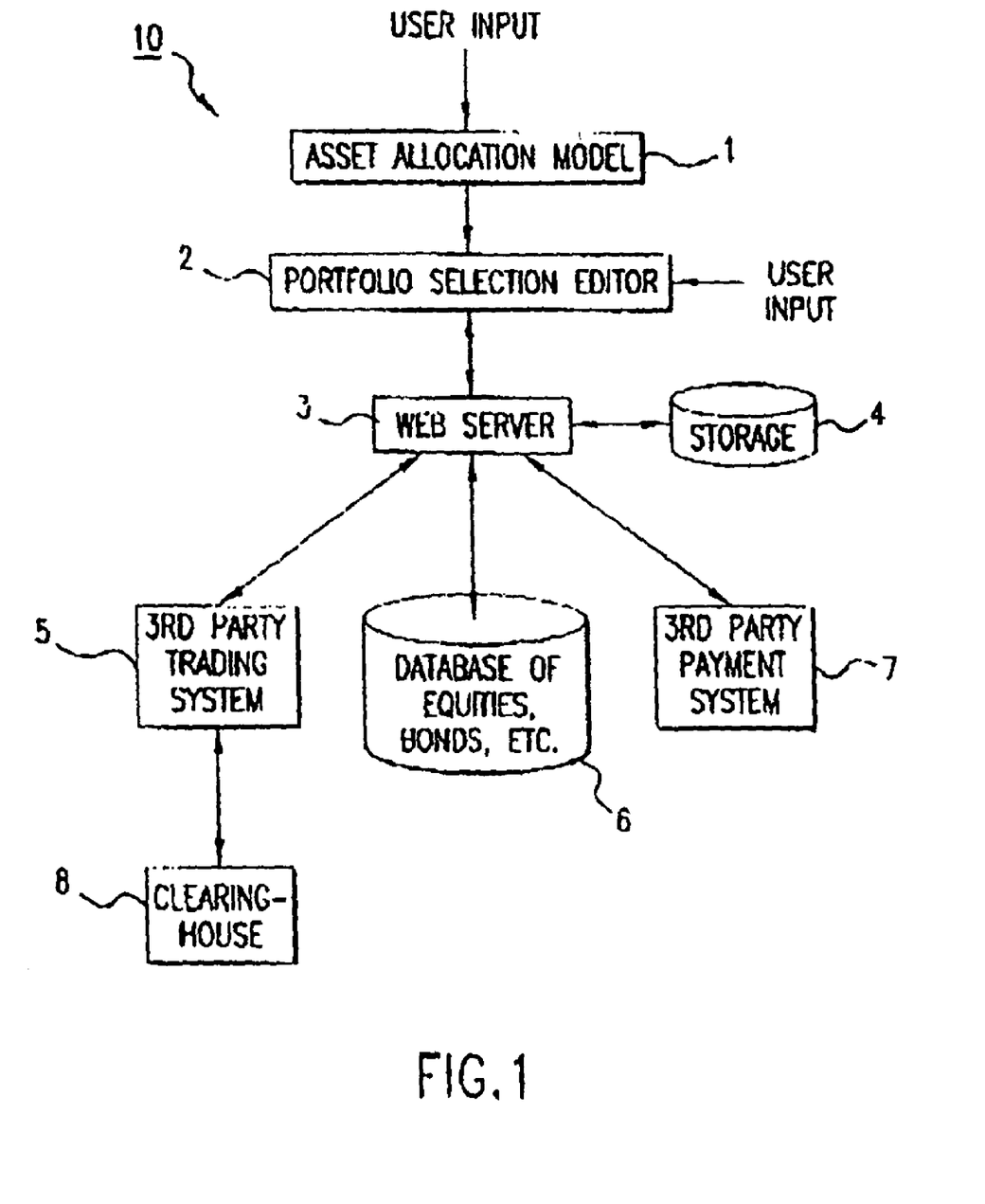
FIG. 1 depicts an exemplary embodiment of a system according to the present invention.

Referring to FIG. 1, shown therein is an exemplary embodiment of a system 10 for creating a portfolio of securities or investments by small or individual users. Larger investors can use the same system, however, its cost efficiencies make possible for the first time diverse portfolios of small periodic investments of money. According to this exemplary embodiment, a user can provide input to an asset allocation model 1, which can help create the user's portfolio of investments. The asset allocation model 1 can interact with a portfolio selection editor in the creation of the user's investment portfolio. A web server 3 can be coupled to storage 4 and database 5 storing information on equities, bonds and other investments. The web server also can be coupled to the user via a computer network such as the Internet. The web server 3 interacts with a third party trading system 5 and a clearinghouse 8 to implement the user's investment portfolio. The web server also employs a third party payment system 7 to obtain payment from the user for the desired investments.

Figure 2:
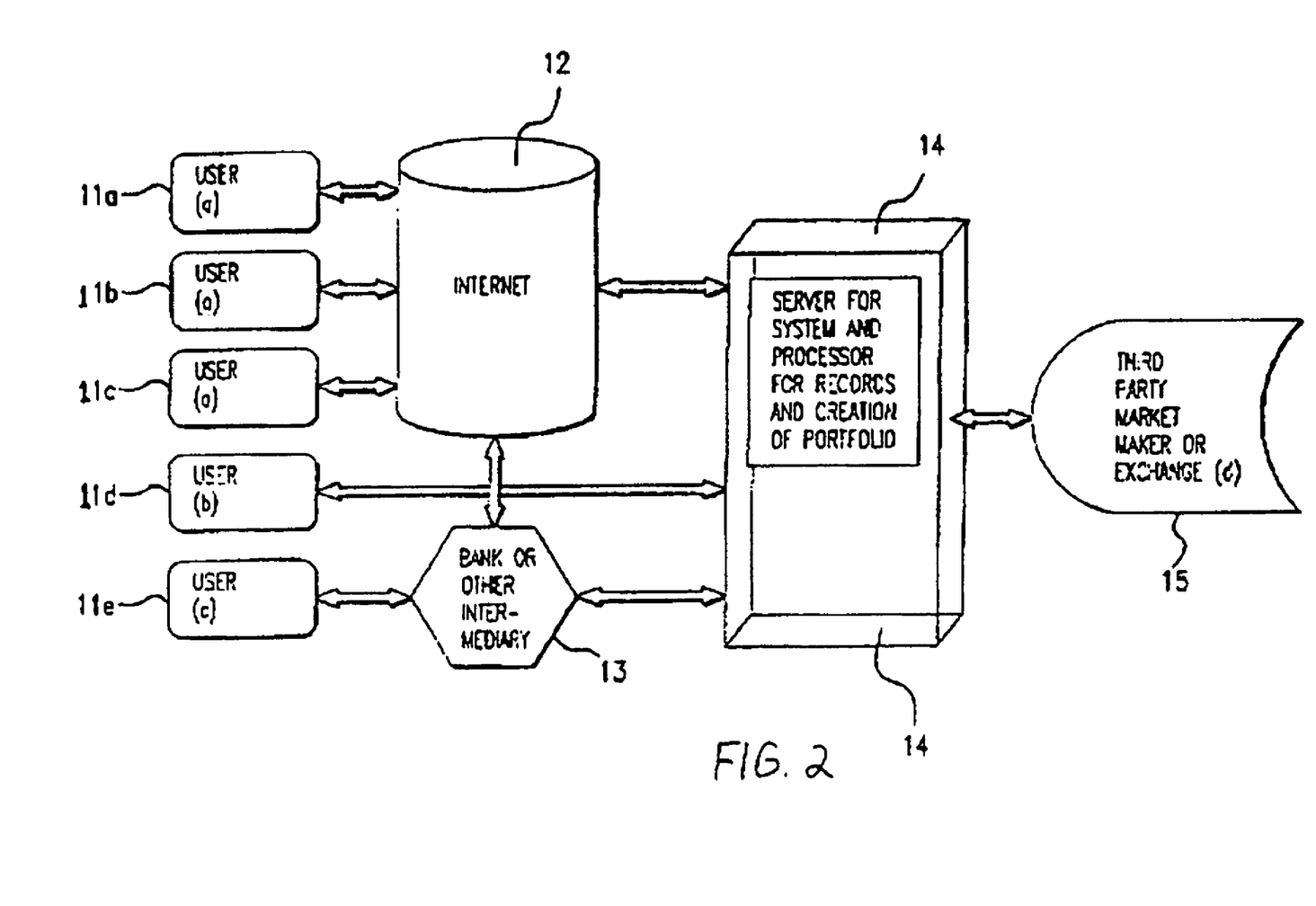
FIG. 2 depicts an exemplary embodiment of another system according to the present invention.

Referring to FIG. 2, shown therein are multiple customers 11a-11e. Each of these customers operates a portfolio management program on his or her personal computer. The portfolio manager enables the customer to create a portfolio of securities with small, periodic investments without the usual inefficient transaction costs normally associated with each transaction. The transactions created by each of the customers 11a can be transmitted via the Internet 12, for example, to a central controller or server 14. Customer 11d can be coupled to the server 14 directly via telephone modem or local area network connection, for example. Customer 11e can be coupled to the server 14 via an intermediary 13, such as a bank. The server 14 is in turn connected to a third party market maker or exchange 15.

The central controller 14 combines (for example, by aggregation and netting) each of the customers orders so that there is only one trade sent to the market maker in each security each transaction cycle, which may occur several times a day. Combining the orders reduces the costs for each of the customers, thereby enabling creation of a diverse investment portfolio for small amounts of money without the otherwise prohibitive costs that are normally incurred on a per transaction basis. Further details of such a system are disclosed in U.S. patent application Ser. Nos. 09/038,158 and 09/139,020, which disclose a portfolio manager for creating and managing portfolios of securities, in which, among other things; trades are aggregated and netted prior to executing certain types of securities trades, both of which applications have been previously incorporated herein by reference.

Figure 3:
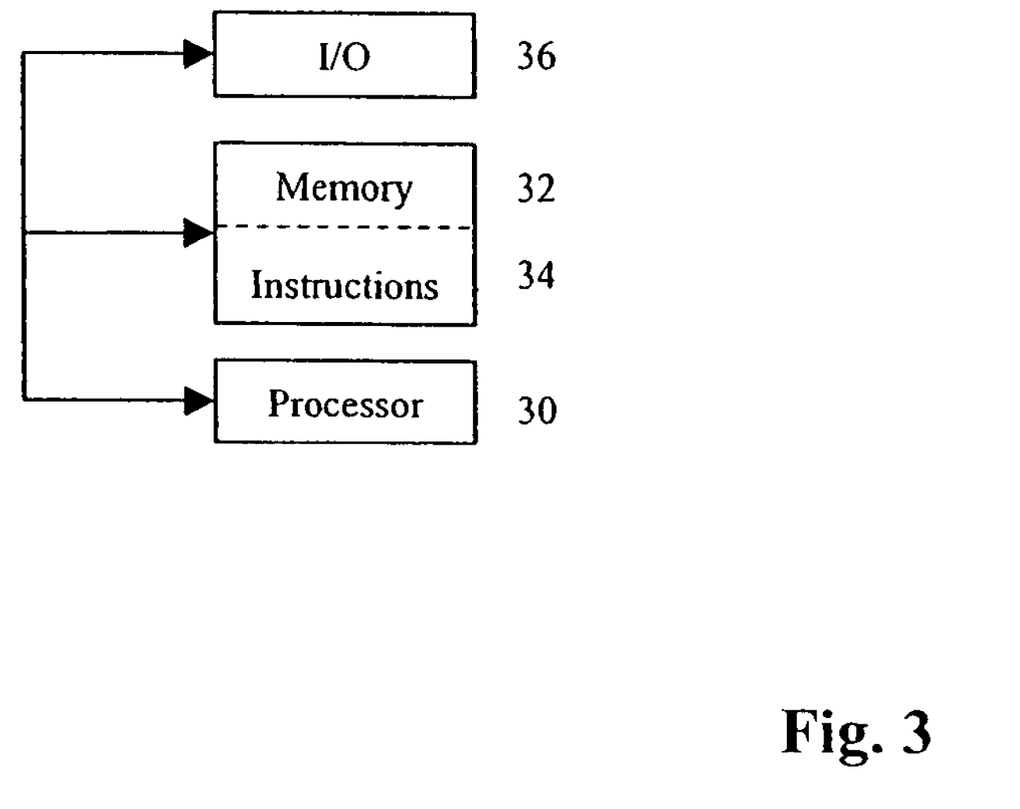
FIG. 3 is a block diagram of a processor that can be embodied in a system of the present invention.

FIG. 3 is a block diagram of an illustrative processor 30, which can be included in controller and/or server 14. Processor 30 can be coupled, either directly or indirectly, to a memory 32 containing instructions 34 that when executed cause processor 30 to perform the various functions of controller and/or server 14. Processor 30 can also be coupled to one or more well-known input/output (I/O) devices 36.

Input/output (I/O) device 36 can be an audio and/or visual device, including, for example, a monitor, display, keyboard, keypad, touch pad, pointing device, microphone, speaker, video camera, camera, scanner, printer, and/or port to which an I/O device can be attached or connected.

In one embodiment, processor 30 can be a general-purpose microprocessor, such as the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

Memory 32 can be any device capable of storing analog or digital information, such as a hard disk, Random Access Memory (RAM), Read Only Memory (ROM), flash memory, a compact disk, a magnetic tape, a floppy disk, and any combination thereof.

Exemplary Embodiment One

Acceptance and Processing of Mixed Orders

According to one exemplary embodiment of the present invention, a system of the present invention operating under control of a brokerage or other financial institution, for example, accepts trading orders whose "quantity" field is specified in terms of how many shares of a particular security are being traded or by how much in value of the particular security being traded is desired to be traded, in accordance with each investor's individual preference. Moreover, the same investors may even transmit orders simultaneously including share-based and value-based trades, thereby requiring the recipient, e.g., the system of the brokerage or financial institution, to accept in a single order trades expressed as value-based and trades expressed as share-based.

An example of a value-based trade includes specifying how many dollars worth of a particular security is to be traded. One can also specify the order in any currency, for example.

Value-based refers to any currency-based or other basis for expressing the size of the order. A value-based trading order does not specify the trade in terms of Y shares of security X to be bought or sold, but rather Y value worth of security X to be bought or sold. In this case, the value could be anything having a known or knowable value, including dollars, yen, euros, any foreign currency, commodities, securities, etc. Thus, the trade could be specified in terms of a commodity, e.g., barrels of oil, ounces of gold, etc., which is readily convertible to any standard currency. Moreover, one might specify a trade in terms of a security in which the trader wishes to sell, such as:

Buy "213 shares of security X worth" of security Y

The portion of the above trading order in quotes (" ") represents the quantity or size specification of this particular order. In this example, the trader wishes to buy 213 shares worth of security Y but also wishes to sell 213 shares of security X. Rather than converting to dollars in the specification of how much is to be traded, or estimating both the purchase price of security Y and the selling price of security X, both of which are difficult to know in advance, the trader simply identifies to the brokerage the resources with which the trader will use to purchase security Y in a single concise statement.

Value-based orders are particularly convenient when the amount of the trade is small relative to a price of the security. When implementing a diverse portfolio of investments for a small investor making small monetary investments, but on a periodic basis, it is more intuitive to the small investor to request a trade in terms of value (e.g., dollars) rather than in a number of fractional shares to be purchased (e.g., 0.01356 shares). Moreover, the actual numbers of shares being purchased is usually not particularly relevant to such an investor, but rather the relevant issue is how much the investor is trading or investing. Particularly for novice investors, specifying trades in terms of value is more intuitive than shares, the precise value of which is often difficult to determine for novice investors as it depends on the number of outstanding shares which fluctuate and the value of the issuer, which even sophisticated investors have difficulty determining.

Therefore, the present invention enables investors or customers to specify a trading order in terms that make more sense to the customer. However, given the large base of investors already comfortable with share-based orders, the present invention provides the capability of accepting different types of trading orders—e.g., value-based and share-based.

For example, investors may transmit orders to the system under control of the brokerage or financial institution (e.g., a server housed in the brokerage or financial institution) in the form of either constant dollars and market price ($P_{mkt}$) or constant shares and market price ($P_{mkt}$). In the former, the market price ($P_{mkt}$) will determine the quantity of shares, whereas in the latter, the market price will determine the dollar amount of the trade. Thus, the brokerage will receive and must then process orders received in terms of shares, dollars and other currencies or denominations.

The following is an example of two trading orders transmitted to a brokerage according to this aspect of the present invention.

Buy 1000 shares of security X at $P_{mkt}$ (market price) and
Buy $100 dollars worth of shares in X at $P_{mkt}$.

The former is a share-based trading order because the quantity of the trading order is specified in terms of a number of shares. The latter is a value-based trading order because the quantity of the trading order is specified in terms of its value, which in this case is further specified in terms of dollars. Thus the latter can be considered a value-based trading order, a currency-based trading order and a dollar-based trading order.

Similarly, one example of trading orders on the sell side includes the following:

Sell 1000 shares of security X at $P_{mkt}$ (market price) and
Sell $100 dollars worth of shares in X at $P_{mkt}$.

As in the above, the former sell order is a share-based trading order because the quantity of the trading order is specified in terms of a number of shares. The latter is a value-based trading order because the quantity of the trading order is specified in terms of its value, which in this case is further specified in terms of dollars. The latter can be considered a value-based trading order, a currency-based trading order and a dollar-based trading order.

It is worthy to note that it may not be possible to implement the value-based sell order at the specified value if the user does not have sufficient shares of security X to sell at the current market price. In this case, the brokerage may either return the value-based sell order or execute the order by selling all of the shares currently owned by the customer at the then prevailing price. In the second case, the brokerage may notify the customer in advance of this possibility for order reconfirmation when the number of shares currently held by the customer is within a predetermined percentage, such as 10% for example, such that an unfavorable price movement in this security would potentially result in the inability to sell the security at the value specified.

In addition, investors may transmit trades to a brokerage as specified in foreign currency, which certain investors may wish to do so, such as investors with proceeds from a foreign investment or transaction, for example. The following is an example of a trading order specified in a foreign currency.

Sell 100 euro worth of shares in X at $P_{mkt}$.

The above order can be considered both a value-based order and a currency-based order, but not a dollar-based order.

As mentioned above, customers may specify a trade in terms of something of value, such as gold bullion. An example of this type of trading order is the following.

Sell 1000 barrels of oil worth of shares in X at $P_{mkt}$.
Buy 10,000 pounds of gold bullion worth of shares in X Both of the above exemplary trading orders may be considered value-based trading orders, but not currency-based or dollar-based trading orders. The latter trading order may be particularly useful if the customer is attempting to both sell gold bullion and buy shares in X.

Yet another exemplary embodiment of an order in which the so-called "quantity" portion of the order is defined in different terms includes specifying the amount of risk the new order will add to one's portfolio. For example, an investor may wish to buy a certain amount of a highly risky stock to move the risk of his portfolio (quantified in terms of "beta") up 0.1 points, or conversely buy a relatively conservative stock to decrease the beta of the portfolio. However, the investor may not know how many shares or even how much value of the particular security he must purchase. In this case, the portfolio manager or brokerage, for example, will calculate the amount of stock based on the holdings currently in the investor's portfolio.

In this embodiment, an order of this type might look something like:

Buy 0.1 Beta worth of security X (tag line with order to include total current beta and total value of portfolio).

In addition, the investor may wish to specify multiple securities to change his beta. For example, suppose the investor wishes to purchase utility stocks to reduce the risk inherent in his portfolio. In this case, the trader might wish to specify three such utility stocks. So, an exemplary order might look like:

Buy 0.1 Beta worth of securities X, Y and Z (tag line with order to include total current beta and total value of portfolio)

In this case, the portfolio manager would spread the risk evenly across these three securities in either even dollar amounts, or even share amount, or in weights based on the various stocks capitalization or other indicia of market value.

Other standard variants of trading orders via which investors may express trading desires are also possible using both dollar-based and share-based specifications, including but not limited to limit orders whose limits are specified in dollars or shares from a dollar value or share amount, respectively, contingent trades whose contingencies are specified in terms of dollars or shares, etc.

All of the above exemplary embodiments of trading orders, including value-based, currency-based, dollar-based and share-based can be implemented, for example, using the well-known Financial Information Exchange (FIX). Existing fields may be provided in which the sender can specify a security, a quantity and a price. In accordance with the FIX protocol, user defined fields can be added to specify other aspects. User-defined fields can be added to this FIX specification to provide fields to specify the denomination in the case of currency-based trading order and to specify the value basis for value-based trading orders. Once in the FIX protocol, these orders can be transmitted to FIX-compliant computers, which are ubiquitous throughout the financial industry.

Exemplary Embodiment

Aggregation/Netting Mixed Orders

Another aspect of the present invention combines all value-based orders and all share-based orders into a single order to buy or sell a value-based amount and/or a single order to buy or sell a share-based amount of each security being traded. If different value bases are used, there may be one order for each value basis, or it may be then combined with the other value bases to form a single value-based order. Various possible techniques for performing this combining are possible.

One possible embodiment of combining trading orders includes aggregating and netting the orders, or simply netting orders against each other as they arrive, for example.

Once the orders are combined into a single value-based order and a single share-based order, they are converted into a single order. One possible embodiment for converting the resulting value-based order and the resulting share-based order into a large final order includes transforming the value into a base currency in which the securities or instruments are being traded.

As used herein, the term "aggregating" can include collecting orders having a similar characteristic, and/or summing such orders. The term "netting" can include comparing aggregated buy orders and sell orders, and ignoring, for the sake of a final order, those buy orders that are balanced by sell orders. The term "converting" can include transforming a value-based order into a share-based order or vice versa, and transforming a value in one currency to a value in another currency. The term "combining" can include aggregating, netting, and converting.

Potentially, all dollar-based orders could net each other out exactly, leaving only a single share-based order, or all share-based orders could net each other out exactly leaving only a single dollar-based order. Moreover, while remotely possible, all share-based orders could net each other out exactly and all dollar-based orders could net each other out exactly leaving nothing to buy or sell. These are special cases of the more general case, however, which we shall consider further.

In the case of orders received in multiple currencies, the system can aggregate and net first all currency-based trading orders in a similar currency, thereby avoiding multiple foreign exchange rate conversions and the inefficiencies associated with such conversions, prior to aggregating and netting the resulting trading order against other value-based (or currency-based) trading orders denominated in different currencies. Each of the trading orders resulting from the aggregation and netting process in a particular currency can be converted to a standard currency, such as the dollar, yen or euro, for example. Once converted to the standard currency, all converted currency-based trading orders can be aggregated and netted against each other to form a single standard-currency-based trading order (either a buy or a sell in each security).

In this foreign currency aggregation and netting, there are two costs savings. First, the cost of conversions is saved for any netted transactions, in that these transactions require no conversions and therefore required no costs. Second, the resulting single conversion will usually be larger than any individual conversion, which can be done at a better rate than a smaller conversion. Both of these cost savings are then passed on to all foreign currency based orders.

In the case of value-based orders, the system can aggregate and net all trading orders using the same value basis before aggregating and netting them against other currency-based trading orders.

An exemplary embodiment of the aggregation and netting of mixed dollar-based and share-based orders operates as follows. First, a system of the present invention combines all share-based orders for a particular security X into a single share-based order for security X; and combines all dollar-base orders for security X into a single dollar-based order for security X, thereby resulting in two single orders, one based in dollars and the other based in shares.

The resulting two-part order from the above process includes: (1) an order to either buy or sell a particular quantity (ranging from zero to any positive number, which is only limited by the number of shares being traded) of shares in X; and (2) an order to either buy or sell a particular dollar amount (ranging from zero to any positive dollar amount, which is only limited by the amount of dollars being traded) of shares in X. In sum, this step results in an aggregated and netted dollar-based order and an aggregated and netted share-based order.

Equitable Allocation Method

According to another exemplary embodiment of the present invention, the schedule of orders may depend not on a single price but instead on two prices commonly referred to as the "bid price" and the "ask price." Where the bid price is not equal to the ask price, as is usually the case, the brokerage will not necessarily provide every investor with the mid-price. Where orders to buy are greater than orders to sell, however, or vice versa, the system equitably allocates prices among customers.

One exemplary embodiment of an equitable allocation method, in which orders to buy are greater than orders to sell, provides that the sellers all receive the mid-price, but the buyers receive a weighted average of the mid-price and the ask price. Conversely, where orders to sell are greater than orders to buy, the exemplary embodiment provides that the buyers all receive the mid-price, but the sellers receive a weighted average of the mid-price and the bid price.

This exemplary embodiment of the present invention provides a method and apparatus for combining, such as by aggregating and/or netting, and executing securities trades on behalf of investors some of whom express their orders in share amounts and some of whom express their orders in dollar amounts, where prices are expressed as a bid price and an ask price. In this embodiment, the system can provide investors with the same price regardless whether an investor expressed an order in terms of dollars or shares (that is, although the price provided to buyers and sellers may differ, the price provided to the class of buyers or the class of sellers may not necessarily vary based on how the buyers or sellers expressed their order).

Under this exemplary embodiment, the system captures the spread between the bid and the ask price and passes the benefits of capturing that spread on to its customers, as follows: (1) in the case of an overall buy order, (a) all sellers receive the mid-price (defined as the price mid-way between the bid price and the ask price) and (b) all buyers pay a price that is a weighted average of the mid-price and the ask price; and (2) in the case of an overall sell order, (a) all sellers receive a price that is a weighted average of the mid-price and the bid price and (b) all buyers receive the mid price.

Apparatus for Determining Schedule of Orders and Performing Aggregation and Netting of Mixed Orders One possible implementation of an apparatus for combining mixed trading orders by, e.g., aggregating and/or netting, includes a central processor coupled to a computer network, such as the Internet, that receives customer orders electronically, aggregates and nets the orders, calculates the schedule of orders and transmits the schedule to the market maker over a computer network, such as the Internet. In this exemplary embodiment, customers execute a portfolio manager program on their personal computers and are linked to the central processor via direct dial-up modem, local area network connection or other computer network, such as the Internet.

CONCLUSION

It should be noted that the above method for combining a collection of trading orders to trade instruments, such as securities, some of which are expressed in value or dollar amounts and some of which are expressed in share amounts, is applicable to many types of brokerages, including, but not limited to a 401 (k) plan that is administered by the brokerage, a trust, an Individual Retirement Account, a Keogh Plan, a Pension Plan, a Qualified Plan, or any other account holding tradable assets or liabilities.

What is claimed is:

1. A computer implemented method for processing a plurality of trading orders for at least one instrument comprising:
    receiving a value-based order to trade at least one instrument by a computer, said value-based order consisting of a specified currency amount of the at least one instrument desired to be traded at a price determined by a market in the at least one instrument;
    receiving a share-based order to trade at least one instrument by the computer, said share-based order including a specified amount of shares of the at least one instrument desired to be traded at a price determined by the market in the at least one instrument;
    combining with a computer the value-based order for the at least one instrument and the share-based order for said at least one instrument to form a single order for the at least one instrument, said single order being a share-based order including a specified amount of shares of the at least one instrument desired to be traded at a price determined by the market in the at least one instrument; and
    submitting the single order to an electronic trading system for execution in a market for the at least one instrument.

2. A computer readable medium storing instructions that, when executed by a processor, cause the processor to:
    receive a value-based order to trade at least one instrument by a computer, said value-based order consisting of a specified currency amount of the at least one instrument desired to be traded at a price determined by a market in the at least one instrument;
    receive a share-based order to trade at least one instrument by the computer, said share-based order including a specified amount of shares of the at least one instrument desired to be traded at a price determined by the market in the at least one instrument;
    combine using a processor the value-based order for the at least one instrument and the share-based order for said at least one instrument to form a single order for the at least one instrument, said single order being a share-based order; and
    submit the single order to an electronic trading system for execution in a market for the at least one instrument.

3. A computer implemented method for processing a plurality of orders for at least one instrument comprising:
    receiving with a computer a plurality of value-based orders for the at least one instrument from a first plurality of investors, each of said plurality of value-based orders consisting of a specified currency amount of the at least one instrument desired to be traded at a price determined by a market in the at least one instrument;
    receiving with a computer a plurality of share-based orders for the at least one instrument from a second plurality of investors; each of said plurality of share-based orders including a specified amount of shares of the at least one instrument desired to be traded at a price determined by the market in the at least one instrument;
    combining with a computer the plurality of value-based orders for the at least one instrument and the plurality of share-based orders for said at least one instrument to form a single order for the at least one instrument, said single order being a share-based order including a specified amount of shares of the at least one instrument desired to be traded at a price determined by the market in the at least one instrument; and
    submitting via a computer network the single order to an electronic trading system for execution in a market for the at least one instrument.

4. A computer implemented method for allocating price among a plurality of investors that include at least one buyer and at least one seller of a security, comprising:
    receiving with a computer a plurality of trading orders from the plurality of investors, some of which plurality of trading orders are expressed as value-based orders, each of said value-based orders including a specified currency amount of the security desired to be traded in a market for the security and some of which plurality of trading orders are expressed as share-based orders, each of said share-based orders including a specified amount of shares of the security desired to be traded in the market for security; and
    assigning with a computer a midpoint price between an ask price and a bid price to each trading order;
    converting with a computer each of the value-based orders to a share-based order using the assigned midpoint price;
    combining with a computer the converted value-based orders with the received share-based orders to form a single order in the security, said single order being a share based order; and
    submitting with a computer the single order for execution over a computer network.

5. A computer implemented method for processing a plurality of trading orders for an instrument comprising:
    receiving with a computer a plurality of currency-based trading orders, each of said currency-based trading orders including a specified currency amount of the instrument desired to be traded in a market for the instrument;
    receiving with a computer a plurality of share-based trading orders, each of said share-based trading orders including a specified amount of shares of the instrument desired to be traded in a market for the instrument;
    netting with a computer all currency-based trading orders in a similar currency to create a plurality of single-similar-currency-based trading orders;
    converting with a computer the plurality of single-similar-currency-based trading orders into a plurality of standard-currency-based trading orders using a predetermined currency exchange rate;

netting with a computer the plurality of standard-currency-based trading orders to create a single standard-currency-based trading order;

converting with a computer the single standard-currency-based trading order to a share-based trading order using a predetermined price for the instrument in the standard currency; and netting with a computer the converted single standard-currency-based trading order and the single share-based trading order to form a single trading order, said single order being a share-based order; and submitting with a computer the single order for execution over a computer network.

6. A computer implemented method for processing a plurality of trading orders for an instrument comprising:

receiving with a computer a plurality of value-based trading orders, each specified in a particular amount of value of the instrument desired to be traded in a market for the instrument;

receiving with a computer a plurality of share-based trading orders, each specified in a particular amount of shares of the instrument desired to be traded in a market for the instrument;

netting with a computer all value-based trading orders in a similar value basis to create a plurality of single-similar-value-basis-value-based trading orders;

converting with a computer the plurality of single-similar-value-basis-value-based trading orders into a plurality of standard-currency-based trading orders using a predetermined exchange rate with regard to the value basis in the standard currency;

netting with a computer the plurality of standard-currency-based trading orders to create a single standard-currency-based trading order;

converting with a computer the single standard-currency-based trading order to a share-based trading order using a predetermined price for the instrument in the standard currency;

netting with a computer the converted single standard-currency-based trading order and the single share-based trading order to form a single trading order, said single order being a share-based order; and submitting with a computer the single order for execution over a computer network.

7. A computer implemented method for trading a plurality of orders for at least one instrument comprising the steps of:

receiving with a computer a plurality of value-based orders for the at least one instrument, wherein the plurality of value-based orders are specified in a value basis different from that in which the instrument is otherwise priced, and each of the plurality of value-based orders are also specified in a particular amount of value of the at least one instrument desired to be traded in a market for the at least one instrument;

receiving with a computer a plurality of share-based orders for the at least one instrument from a second plurality of investors, each of the plurality of share-based orders specified in a particular amount of shares of the at least one instrument desired to be traded in a market for the at least one instrument;

combining with a computer the plurality of value-based orders and the plurality of share-based orders for said at least one instrument to form a single order for the at least one instrument, said single order being a share-based order including a specified amount of shares of the at least one instrument desired to be traded in a market for the at least one instrument;

submitting the single order with a computer over a computer network for execution in the market for the at least one instrument; and executing with a computer at least one trade in the at least one instrument.

* * * * *

UNITED STATES PATENT AND TRADEMARK OFFICE
CERTIFICATE OF CORRECTION

| | |
|---|---|
| PATENT NO. | : 7,844,538 B2 |
| APPLICATION NO. | : 11/898150 |
| DATED | : November 30, 2010 |
| INVENTOR(S) | : Steven M. H. Wallman |

It is certified that error appears in the above-identified patent and that said Letters Patent is hereby corrected as shown below:

On the title page of the patent, at item (73) Assignee, change the name of the Assignee from "Folio, Inc." to -- FOLIOfn, Inc. --.

Signed and Sealed this
Tenth Day of May, 2016

Michelle K. Lee
*Director of the United States Patent and Trademark Office*